Aug. 13, 1940.　　　　B. V. ORRE　　　　2,211,515
TEAT CUP FOR MILKING MACHINES
Filed Sept. 9, 1938
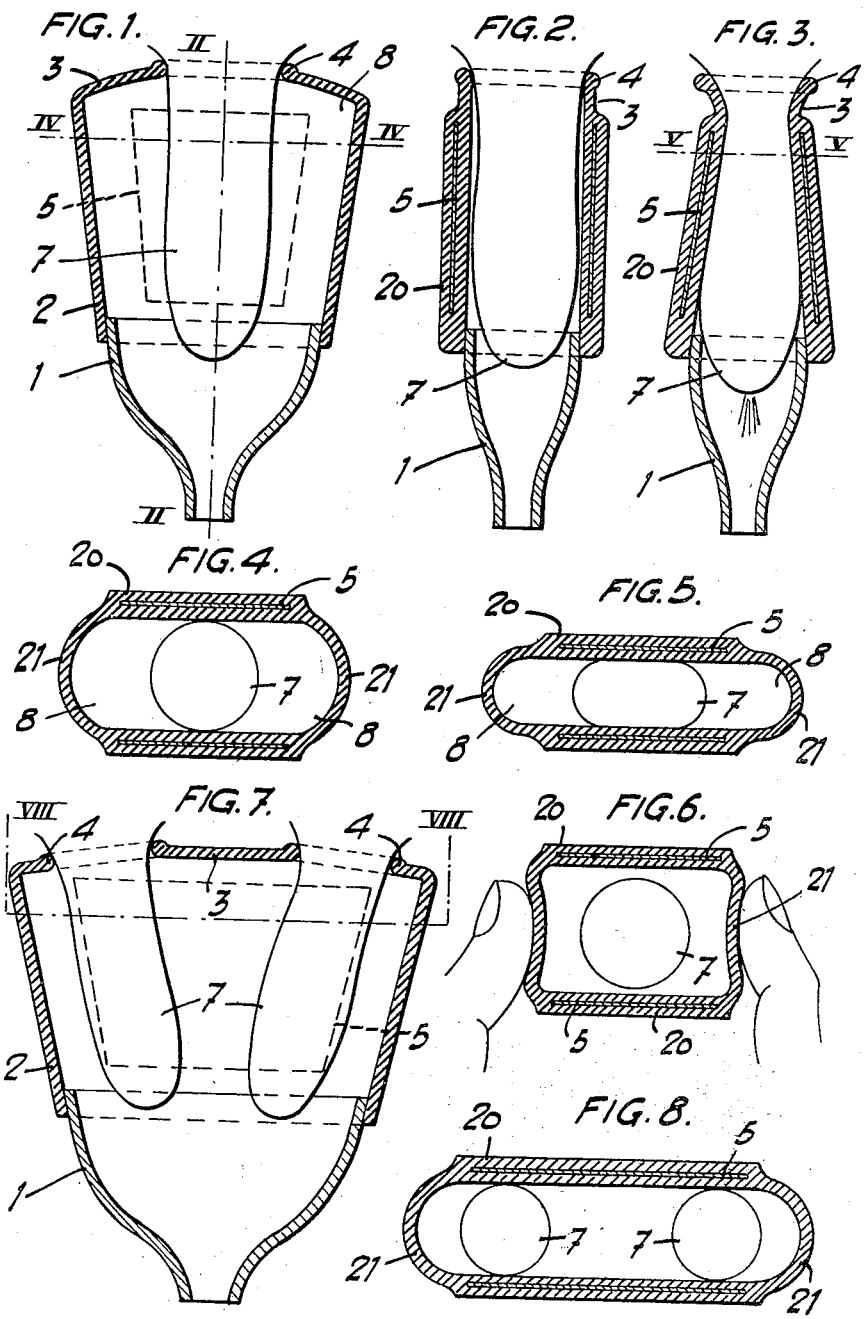
Inventor
Berndt V. Orre
by Sommers & Young
Attys.

Patented Aug. 13, 1940

2,211,515

UNITED STATES PATENT OFFICE 2,211,515

TEAT CUP FOR MILKING MACHINES

Berndt Victor Orre, Stocksund, Sweden

Application September 9, 1938, Serial No. 229,175
In Sweden September 13, 1937

3 Claims. (Cl. 31—84)

This invention relates to teat cups for milking machines. It is desirable in connection with milking machines that the teat cup shall exert a pressure on the teat which progresses in a direction from the root of the teat towards the tip thereof in order that the teat may be subjected to an action which corresponds both to the calf's sucking and to the manual milking operation. To this end the elastic sleeve of the teat cup adapted to surround the teat should be more deformable at its top than it is further down. If the pressure acts at the same time that the interior of the teat cup is subjected to a suction, the said higher deformability of the upper portion of the sleeve will result in a compression of the sleeve at its top under the influence of the difference between the higher pressure acting on the outside of the sleeve and the lower pressure (or vacuum) acting on the inside of the sleeve, before the teat has had an opportunity to enter the sleeve.

This invention has for its object to provide a teat cup which is adapted to operate under the influence of an intermittent suction acting on the inside of the cup and the atmospheric pressure acting on the outside of the cup simultaneously with the suction and cooperating therewith and which pressure progresses from the root of the teat towards the tip thereof. The teat cup according to the invention is so constructed as to allow this pressure to be suppressed during the period of time during which the teat is to be inserted into the teat cup.

The invention is characterized, chiefly, by the fact that the teat cup is provided with two substantially flat side walls stiffened against bending about a vertical axis which are adapted to compress a teat or the two teats of an udder half between themselves, said side walls being connected together by means of elastic, substantially semicylindrical end walls which allow the side walls to move towards and from each other. It is of importance, as far as the stiffening of the side walls is concerned, that the stiffening members present substantially vertical edges of such a length as to afford a sufficient support for the applying of a manual pressure which against the action of the suction can fix the side walls in desired position; in other words, said vertical edges must be of a length corresponding nearly to the depth of the deformable portion of the teat cup and to the length of the teat. As far as the end walls are concerned, it is essential that said walls be sufficiently convex to allow the side walls to retire from each other to such an extent as to permit the teat to fully enter the teat cup under the influence of the suction without interference by the side walls when the end walls are pressed together manually.

In the accompanying drawing several embodiments of the invention are illustrated. Fig. 1 is a vertical longitudinal section of a teat cup for a single teat. Fig. 2 is a vertical cross section of the same teat cup in uncompressed state, and Fig. 3 is a similar section of the teat cup in compressed state. Fig. 4 is a horizontal section on the line IV—IV of Fig. 1, and Fig. 5 is a horizontal section on the line V—V of Fig. 3. Fig. 6 is a horizontal section of the same teat cup with the side walls removed from each other as a result of a manual pressure on the end walls. Fig. 7 is a vertical longitudinal section of a teat cup for two teats in uncompressed state, and Fig. 8 is a horizontal section of the same teat cup on the line VIII—VIII of Fig. 7.

In all of the embodiments shown the teat cup comprises a lower portion 1 in the form of a flattened funnel made of some suitable, inflexible material, and an upper portion 2 made principally of an elastic material as india rubber. The upper portion 2 supports a cover 3 which may be integral with the upper portion, as shown, or removable. The cover is formed with one or two openings surrounded by rounded collars 4 for the insertion of one or two teats 7.

The upper portion 2 is of an oval cross section and consists of two nearly parallel, substantially plane side walls 20 and two normally semicylindrical end walls 21 connecting the side walls.

The side walls 20 are each formed with a stiffening member with the object in view of preventing a lateral bending of the walls, that is, a bending about a vertical axis. The stiffening members may be of various kinds. For instance, they may comprise a metal plate 5 in each side wall. The end walls 21, on the contrary, are wholly elastic. The width of the side walls 20 is, preferably, increasing upwards, and the area of said walls should be so large that the teat when inserted into the teat cup, after the end walls 21 have been pressed inwardly, will not interfere with these end walls.

On the generation of a vacuum inside the teat cup, the top of the upper portion 2, that is to say, the part thereof above the stiffening members, will be first compressed, as shown in Fig. 3, while the lowermost part of said upper portion cannot be compressed at all due to its connection with the rigid lower portion 1. To begin with, the entire pressure exerted by the side walls 2 will, therefore, act at the upper portion, i. e., on the root of the teat 7, and only thereafter the side walls will be bent inwardly to their entire extent into the oblique position shown in Fig. 3. Thus, the pressure exerted by the side walls on the teat will act from above downwardly, that is to say, from the root of the teat to the tip thereof, as in the manual milking operation.

Because the suction acting inside the teat cup is intermittent, it is necessary, in order to keep the teat cup in engagement with the teat during the period of time during which vacuum exists in the cup, that the opening to receive the teat be so narrow with relation to the diameter of the teat, and the side walls engage the teat in such a way that it is possible to introduce the teat into the teat cup only because of the presence of the suction.

As soon as said opening is closed by the tip of the teat, the side walls would be immediately pressed together, thereby rendering the continued entering of the teat impracticable, if no means were provided to avoid this result. According to the invention this action may be eliminated by pressing together the end walls 21 with the fingers, as shown in Fig. 6. The end walls 21 when thus acted upon, move the side walls from each other sufficiently to allow the teat to freely enter the teat cup, as will appear from the figure, where the outline of a teat is indicated by a circle 7.

As shown in Figs. 7 and 8, a teat cup may be dimensioned to receive a pair of teats belonging to the same udder half. The operation will in this case be similar to that above described.

It is to be noted that modifications may be made without departing from the principle of the invention. Thus, if desired, only one side wall may be stiffened and movable, the other side wall being rigid and immovable. In such case said rigid side wall may be rigidly connected to the lower portion 1 or formed integrally therewith, i. e., non-deformable like said portion, this rigid side wall only serving as a support for the teat or teats towards which the same is or are pressed by the opposite, movable side wall. The teat cup may be made in a single piece, i. e., the lower portion and the upper portion may be integral. In this case the lower portion may, preferably, be thicker than the upper portion or provided with a surrounding stiffening member in order to obtain the necessary rigidity.

What I claim is:

1. A teat cup having stiffened side walls adapted to press upon a teat from opposite sides thereof, and having elastic end walls connecting said side walls, the end walls being approximately semicylindrical in horizontal section and the side walls being flat and provided with approximately parallel stiffening members of such a form and area related to the side walls that they may be moved apart from each other against a vacuum inside the cup, while maintaining their parallel relation to each other by the exertion of a pressure with the fingers upon the semicylindrical end walls.

2. A teat cup having stiffened side walls adapted to press upon a teat from opposite sides thereof, and having elastic end walls connecting said side walls, the end walls being flat and provided with approximately parallel stiffening members of a length corresponding substantially to the length of the portion of the side walls adapted to engage the teat and of a width which corresponds at all points of the length of the members substantially to the distance between the semicylindrical end walls.

3. A teat cup having two flat, approximately parallel, stiffened side walls and two elastic end walls which are approximately semicylindrical in horizontal section, connecting the side walls, a rigid tubular base portion carrying the teat cup, approximately parallel stiffening members embedded in the side walls of the cup, said members being bounded by straight edges so as to cover an area of a width corresponding approximately to the width of the side walls for enabling the side walls to be moved from each other against a vacuum inside the cup, while maintaining their mutual parallel position by the exertion of a pressure with the fingers on the semicylindrical end walls.

BERNDT VICTOR ORRE.